United States Patent
Lee et al.

(10) Patent No.: US 6,836,066 B1
(45) Date of Patent: Dec. 28, 2004

(54) TRIODE FIELD EMISSION DISPLAY USING CARBON NANOBTUBES

(75) Inventors: Hang-woo Lee, Suwon (KR); Nae-sung Lee, Seoul (KR); Yong-soo Choi, Seoul (KR); Jong-min Kim, Seongnam (KR)

(73) Assignee: Samsung SDI Co., Ltd., Suwon-si (KR)

( * ) Notice: Subject to any disclaimer, the term of this patent is extended or adjusted under 35 U.S.C. 154(b) by 147 days.

(21) Appl. No.: 09/695,253

(22) Filed: Oct. 25, 2000

(30) Foreign Application Priority Data

Feb. 25, 2000 (KR) .......................................... 2000-9394

(51) Int. Cl.[7] .............................. H01J 1/62; H01J 63/04
(52) U.S. Cl. ...................... 313/497; 313/495; 313/496
(58) Field of Search ................................ 313/495, 496, 313/497, 336, 351, 309

(56) References Cited

U.S. PATENT DOCUMENTS

| | | | |
|---|---|---|---|
| 5,726,524 A | | 3/1998 | Debe |
| 5,773,834 A | | 6/1998 | Yamamoto et al. ...... 250/423 F |
| 5,773,921 A | * | 6/1998 | Keesmann et al. .......... 313/309 |
| 5,773,927 A | * | 6/1998 | Zimlich ....................... 313/495 |
| 6,107,733 A | * | 8/2000 | Jager ............................ 313/496 |

FOREIGN PATENT DOCUMENTS

| | | |
|---|---|---|
| EP | 0 838 831 A2 | 4/1998 |
| GB | 1 303 800 | 1/1973 |
| GB | 2 330 687 A | 4/1999 |
| JP | 9-11536 | 9/1997 |
| WO | WO 96/42101 | 12/1996 |

OTHER PUBLICATIONS

Masako Yudasaka, "Specific conditions for Ni catalyzed carbon nanotube growth by chemical vapor deposition", Appl. Phys. Lett. 67 (17), Oct. 23, 1995, pp. 2477–2479.

Kazuhiro Yamamoto, "New method of carbon nanotube growth by ion beam irradiation", Appl. Phys. Lett. 69 (27), Dec. 30, 1996, pp. 4174–4175.

L. C. Qin, "Growing carbon nanotubes by microwave plasma–enhanced chemical vapor deposition", Appl. Phys. Lett. vol. 72, No. 26, Jun. 29, 1998, pp. 3437–3439.

* cited by examiner

Primary Examiner—Vip Patel
Assistant Examiner—Mariceli Santiago
(74) Attorney, Agent, or Firm—Burns, Doane, Swecker & Mathis, L.L.P.

(57) ABSTRACT

A triode field emission display using carbon nanotubes having an excellent electron emission characteristic is provided. By forming extraction electrodes for controlling emitted electrons around an anode on a front substrate, the triode field emission display (FED) using carbon nanotubes has a simple structure like a diode FED, thereby facilitating manufacture using vapor deposition of carbon nanotubes and allowing control of anode current using extraction electrodes. Accordingly, a large FED can be simply manufactured.

4 Claims, 3 Drawing Sheets

TRIODE FIELD EMISSION DISPLAY USING CARBON NANOBTUBES

This application claims priority under 35 U.S.C. §§119 and/or 365 to 00-9394 filed in Korea on Feb. 25, 2000; the entire content of which is hereby incorporated by references.

BACKGROUND OF THE INVENTION

1. Field of the Invention

The present invention relates to a triode field emission display using carbon nanotubes having an excellent electron emission characteristic.

2. Description of the Related Art

In a conventional field emission display (FED), when a strong electric field is applied through gates to a Spindt's field emitter array (FEA), which is formed of a metal such molybdenum (Mo) or a semiconductor material such as silicon (Si), that is, to microtips arranged at regular intervals, electrons are emitted from the microtips. The emitted electrons are accelerated toward anodes, to which voltage (for example, several hundred to several thousand volts) is applied, and collide with phosphors with which the anodes are coated, thereby emitting light. Because the work function of a metal or a semiconductor material used for the microtips of a conventional FED is large, the gate voltage for electron emission must be very high. Residual gas particles in vacuum collide with electrons and are thus ionized. Because the microtips are bombarded with these gas ions, the microtips as an electron emission source may break. Moreover, since particles are separated from the phosphors colliding with electrons and pollute the microtips, the performance of the electron emission source may be deteriorated. These problems may reduce the performance and life of the FEA. To overcome these problems, instead of a metal or a semiconductor material, carbon nanotubes having a low electron emission voltage and an excellent chemical stability is used for microtips. In this case, the performance and life of the FEA can be improved.

Arc discharge and laser ablation is widely used in deposition of carbon nanotubes, but these methods are not suitable for mass production of carbon nanotubes at a low cost, and structure control is difficult in these methods. To overcome these problems, vapor deposition has been developed. Representative vapor deposition methods include thermal chemical vapor deposition (CVD) (Appl. Phys. Lett. 67, 2477, 1995), MPECVD (Appl. Phys. Lett. 72, 3437, 1998) and ion beam irradiation (Appl. Phys. Lett. 69, 4174, 1996).

While the electron emission electrical field of a diamond film, which has been highlighted as a material of an electron emission source, is about 10 V/$\mu$m, carbon nanotubes have a characteristic in which electrons are easily emitted even at an electrical field of 1 V/$\mu$m or less. Accordingly, carbon nanotubes have been touted as the next generation material of an electron emission source.

FIG. 1 is a schematic sectional view illustrating the structure of a conventional FED using carbon nanotubes. As shown in FIG. 1, the conventional FED using carbon nanotubes includes a front substrate 1 and a rear substrate 6 which face each other, an anode 2 and a cathode 5 which are formed on the surfaces of the two substrates 1 and 6 facing each other, respectively, phosphor 3 with which the anode 2 is coated, and carbon nanotubes 4 with which the cathode 5 is coated, thereby having a diode structure. A power supply 7 is applied between the anode 2 and the cathode 5.

It is crucial to deposit carbon nanotubes on a wide area at a low cost using a method capable of controlling the carbon nanotubes in manufacturing FEDs using carbon nanotubes. It is considered that vapor deposition should be used to achieve the above purpose. Similarly to arc discharge or laser ablation, vapor deposition uses a transition metal such as nickel (Ni) or iron (Fe) or silicide such as $CoSi_2$ as a catalyzer. Carbon nanotubes are not deposited on a structure of a predetermined pattern but have still been deposited randomly as in a diode structure. The diode structure can easily be manufactured by vapor deposition because a layer such as an insulating layer or a gate shown in a triode structure is not necessary. However, it is difficult to control emitted electrons in a simple diode structure. This disturbs the smooth performance of a display.

A field emitter using controlled carbon nanotubes is disclosed in U.S. Pat. No. 5,773,834. In this patent, a field emitter is formed in a triode structure using a grid of a net shape as gate electrodes so that emitted electrons can be easily controlled. However, the structure of the field emitter is not simple enough to be easily manufactured by vapor deposition like a diode structure.

SUMMARY OF THE INVENTION

To solve the above problem, an object of the present invention is to provide a triode field emission display (FED) using carbon nanotubes, which has a simple triode structure similar to a diode structure in which control of emitted electrons is easy, thereby allowing deposition of carbon nanotubes on a wide area at a low cost.

To achieve the above object, the present invention provides a triode FED using carbon nanotubes, which includes front and rear substrates disposed to face each other and separated by a predetermined distance, a cathode formed on the rear substrate, carbon nanotubes formed on the cathode, an anode formed on the front substrate, phosphor formed on the anode, and an extraction electrode formed on the front substrate on which the anode is formed, the extraction electrode being separated from the anode by a predetermined distance.

In another aspect, the present invention provides a triode FED using carbon nanotubes, which includes front and rear substrates disposed to face each other and separated by a predetermined distance, cathode lines formed on the rear substrate in a striped pattern, carbon nanotubes formed on the cathode lines at regular intervals, anode lines formed on the front substrate in a striped pattern crossing the cathode lines, phosphor formed on the anode lines, and extraction electrodes formed on the front substrate on which the anodes are formed, each extraction electrode being separated from each adjacent anode by a predetermined distance, the extraction electrodes being formed in a striped pattern parallel to the anode lines.

BRIEF DESCRIPTION OF THE DRAWINGS

The above object and advantage of the present invention will become more apparent by describing in detail preferred embodiments thereof with reference to the attached drawings in which.

DETAILED DESCRIPTION OF THE INVENTION

Figure 1:
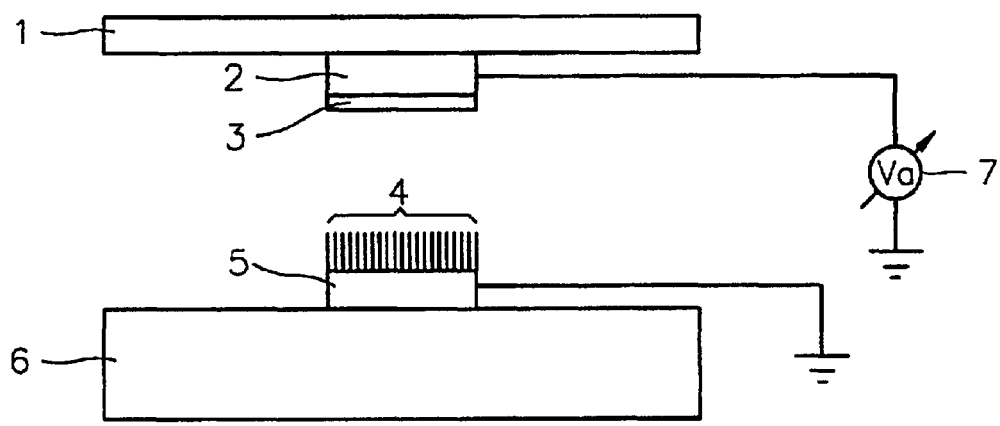
FIG. 1 is a schematic sectional view of a conventional diode field emission display (FED) using carbon nanotubes.
Figure 2:
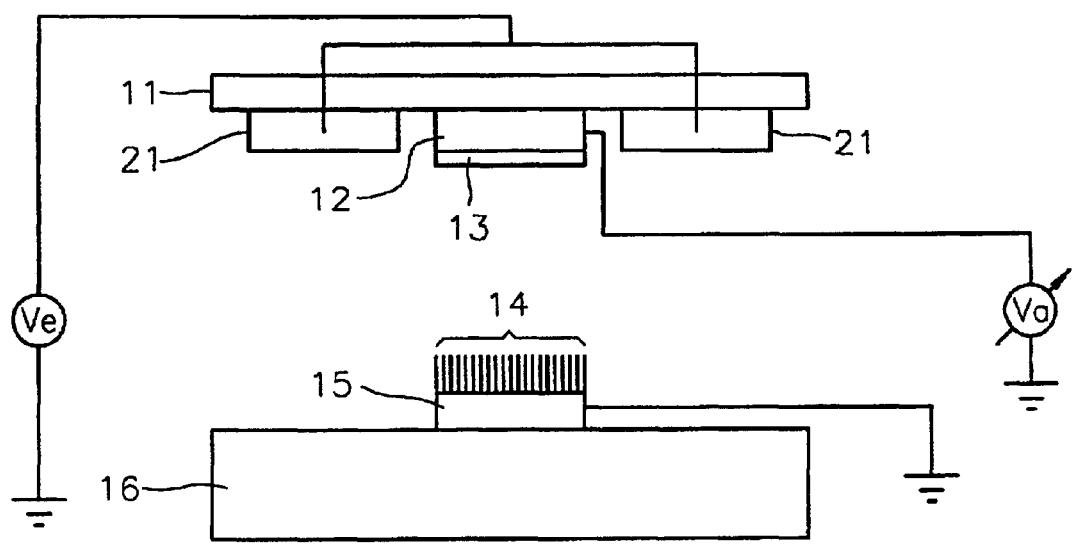
FIG. 2 is a schematic sectional view of a triode FED using carbon nanotubes according to the present invention.

Referring to FIG. 2, a triode field emission display (FED) of the present invention is formed by depositing carbon nanotubes having an excellent electron emission characteristic on an anode using vapor deposition and disposing extraction electrodes acting as gates around the anode on the same surface as that on which the anode is formed. Accordingly, the triode FED of the present invention has a triode electron emission structure.

Figure 3:
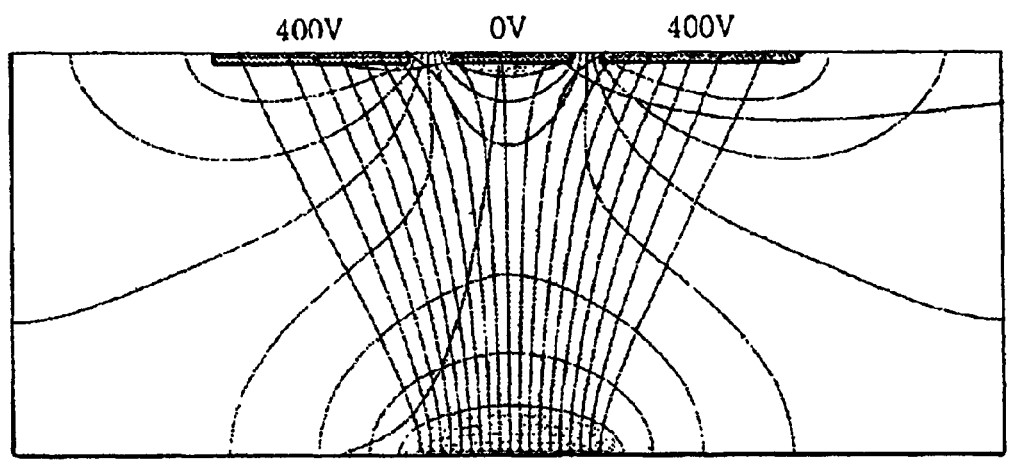
FIG. 3 is a graph illustrating the results of simulation of traces of electrons emitted from carbon nanotubes at an anode voltage of 0 V depending on the fixed extraction voltage in the triode FED of FIG. 2.
Figure 4:
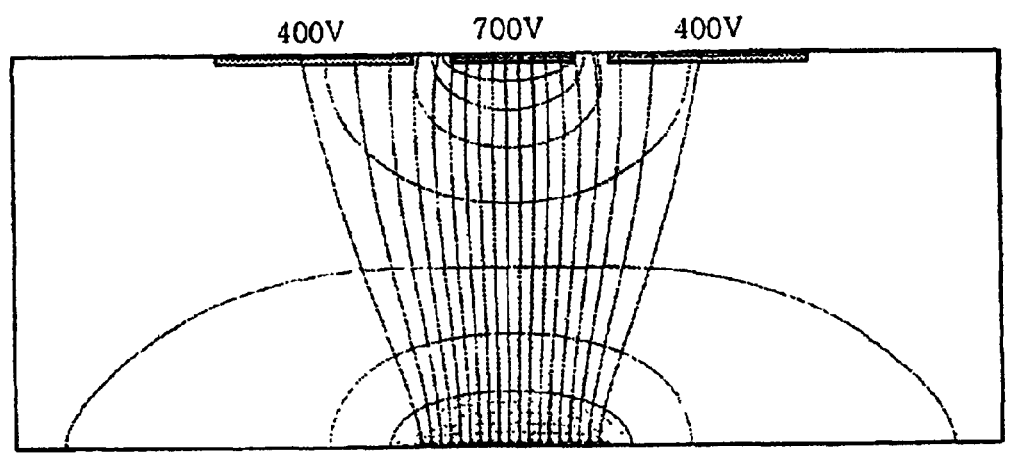
FIG. 4 is a graph illustrating the results of simulation of traces of electrons emitted from carbon nanotubes at an anode voltage of 700 V depending on the fixed extraction voltage in the triode FED of FIG. 2.

As shown in FIG. 2, a conductive cathode line 15 is formed of a transparent electrode or metal on a rear glass substrate 16. Carbon nanotubes 14 are disposed on the cathode line 15. Extraction electrodes 21 are disposed on a front glass substrate 1 to excite and make the carbon nanotubes 14 emit electrons. An anode 12 is coated with phosphor 13 and disposed between the extraction electrodes 21. In this structure, when a certain voltage Ve for extracting electrons from the carbon nanotubes 14 is applied to the extraction electrodes 21 and an anode voltage Va is changed, traces of electrons, as shown in FIGS. 3 and 4, are obtained. These traces of electrons are the result of simulation.

FIG. 3 shows the traces of emitted electrons when an anode voltage is 0 V. It can be seen that electrons emitted from carbon nanotubes are dispersed toward extraction electrodes since the anode voltage is lower than the voltage (400 V) of the extraction electrodes. FIG. 4 shows the traces of emitted electrons when an anode voltage is 700 V. It can be seen that electrons emitted from carbon nanotubes collected more toward the anode since the anode voltage is higher than the voltage (400 V) of the extraction electrodes. It is noted from these results that the amount of electrons colliding with phosphor on an anode can be controlled by controlling the voltage applied to extraction electrodes.

Figure 5:
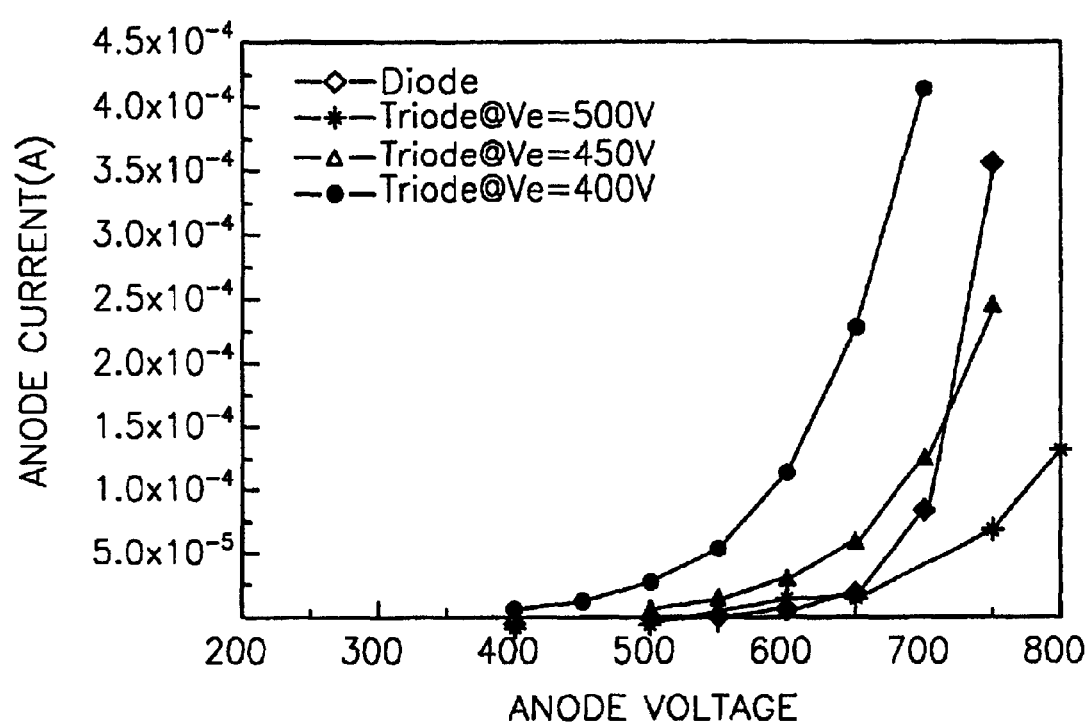
FIG. 5 is a graph illustrating anode volt-ampere characteristic curves of diode and triode carbon nanotube FEDs depending on the change in extraction voltage.

Actually, FIG. 5 proves this conclusion. FIG. 5 is graph showing the emission characteristic of a triode FED which was actually manufactured according to an embodiment of the present invention, as shown in FIG. 2. FIG. 5 shows the values of anode current depending on anode voltage with respect to a voltage Ve applied to extraction electrodes. When the voltage Ve applied to extraction electrodes is increased from 400 V by 50 V each time, such as 450 V and 500 V, the anode current depending on the anode voltage shows the typical voltage-current characteristic curves of a triode structure. Referring to FIG. 5, as the anode voltage is increased, the anode current increases. In addition, as the voltage Ve of the extraction electrodes is increased, emitted electrons are dispersed more toward the extraction electrodes. Consequently, the anode current decreases.

As described above, by forming extraction electrodes for controlling emitted electrons around an anode on a front substrate, a triode FED using carbon nanotubes according to the present invention has a simple structure like a diode FED, thereby facilitating manufacture using vapor deposition of carbon nanotubes and allowing control of anode current using extraction electrodes. Therefore, the present invention allows a large FED to be simply manufactured.

What is claimed is:

1. A triode field emission display (FED) using carbon nanotubes, comprising:

front and rear substrates disposed to face each other and separated by a predetermined distance;

a cathode formed on the rear substrate;

carbon nanotubes formed on the cathode;

an anode formed on the front substrate;

phosphor formed on the anode; and an extraction electrode formed on the front substrate on which the anode is formed, the extraction electrode being separated from the anode by a predetermined distance and upon selective biasing acts to extract electrons away from impinging on the phosphor formed on the anode.

2. A triode field emission display (FED) using carbon nanotubes, comprising:

front and rear substrates disposed to face each other and separated by a predetermined distance;

cathode lines formed on the rear substrate in a striped pattern;

carbon nanotubes formed on the cathode lines at regular intervals;

anode lines formed on the front substrate in a striped pattern crossing the cathode lines;

phosphor formed on the anode lines; and extraction electrodes formed on the front substrate on which the anodes are formed, each extraction electrode being separated from each adjacent anode by a predetermined distance, the extraction electrodes being formed in a striped pattern parallel to the anode lines and upon selective biasing act to extract electrons away from impinging on the phosphor formed on the anode.

3. A triode field emission display (FED) using carbon nanotubes, comprising:

front and rear substrates disposed to face each other and separated by a predetermined distance;

a cathode formed on the rear substrate;

electron emitters formed on the cathode;

an anode formed on the front substrate;

phosphor formed on the anode; and an extraction electrode formed on the front substrate on which the anode is formed, the extraction electrode being separated from the anode by a predetermined distance and upon selective biasing acts to extract electrons away from impinging on the phosphor formed on the anode.

4. A triode field emission display (FED) using carbon nanotubes, comprising:

front and rear substrates disposed to face each other and separated by a predetermined distance;

cathode lines formed on the rear substrate in a striped pattern;

electron emitters formed on the cathode lines at regular intervals;

anode lines formed on the front substrate in a striped pattern crossing the cathode lines;

phosphor formed on the anode lines; and extraction electrodes formed on the front substrate on which the anodes are formed, each extraction electrode being separated from each adjacent anode by a predetermined distance, the extraction electrodes being formed in a striped pattern parallel to the anode lines and upon selective biasing act to extract electrons away from impinging on the phosphor formed on the anode.

* * * * *